United States Patent [19]

Falk

[11] 4,219,057
[45] Aug. 26, 1980

[54] TIMBER TO FIREWOOD PROCESSING MACHINE

[76] Inventor: David C. Falk, 6808 Greystone Dr., Raleigh, N.C. 27609

[21] Appl. No.: 910,364

[22] Filed: May 30, 1978

[51] Int. Cl.² .................................................. B27L 7/00
[52] U.S. Cl. .................................. 144/3 K; 144/2 Z; 144/192; 144/193 A
[58] Field of Search .......... 144/3 K, 3 D, 192, 193 R, 144/193 A, 323, 2 Z; 53/522, 582, 592; 100/2

[56] References Cited
U.S. PATENT DOCUMENTS

| 369,603 | 9/1887 | Kingston | 144/192 |
|---|---|---|---|
| 1,985,462 | 12/1934 | Schapiro | 144/192 |
| 3,498,347 | 3/1970 | Vit | 144/3 D |
| 3,763,905 | 10/1973 | Hamilton et al. | 144/3 D |
| 3,972,357 | 8/1976 | Neal et al. | 144/312 |
| 4,076,061 | 2/1978 | Greeninger | 144/3 K |

*Primary Examiner*—W. Donald Bray
*Attorney, Agent, or Firm*—Mills & Coats

[57] ABSTRACT

In abstract a preferred embodiment of this invention is a processing machine which takes a felled tree, delimbs the same, feeds the thus trimmed timber through the machine which cuts the timber into fireplace lengths, splits the thus cut logs in one or more directions for appropriate burning size, stacks the split wood into a bundler and bales the same for market transport prior to being removed from the machine.

2 Claims, 5 Drawing Figures

TIMBER TO FIREWOOD PROCESSING MACHINE

BACKGROUND OF THE INVENTION

This invention relates to devices for producing burnable size firewood and more particularly to a machine for converting tree type timber into baled, ready for market firewood.

In the past apparatus generally known as tree harvesters have been developed which either cut or shear the standing tree at the stump, and through the use of hydraulic arms would delimb the cut timber and even cut the same into merchantable log lengths.

Log splitters have also been developed although these have almost invariably required steady ground support during operation. The only mobility found in these prior art log splitters have been transport wheels on the smaller units so that they can be rolled from the storage shed to the wood pile and back. These prior known splitters are not considered in the real sense of the word mobile and certainly are a far cry from being self-propelled.

Strapping devices have been developed for use in conjunction with everything from cotton bales to brick stacks and sewer pipes. These means generally are in the form of a steel band with a lever actuated tightener or sleeve crimper for securing the same.

With the shortage of fossil fuels getting worse and the cost of heating energy whether fuel oil, gas or electricity increasing drastically, more and more people are reverting to the use of wood stoves and fireplaces for at least supplemental heating. Also, commercial operations are beginning to use wood as an alternate energy source such as in the heating of bulk tobacco curing barns. Other industrial users of heating energy will certainly in the future be reverting over to our only replenishable energy source, namely wood.

Even the most efficient commercial processor of firewood today takes logs which have been cut up (usually by hand using chain saws) into proper firewood lengths and the same are split on an automatic or semi-automatic log splitter which is stationarily mounted on the ground. The wood is then stacked for later shipment to the marketplace or purchaser thereof. This wood is almost invariably loose stacked and delivered to the customer in such condition which requires either dumping or hand-stacking the wood at a convenient location for later retrieval and use.

There has not been to-date any efficient method developed for processing and handling firewood on a large scale which will make it readily available as an alternate energy source.

SUMMARY OF INVENTION

After much research and study into the abovementioned problems, the present invention has been developed to provide a highly efficient timber to firewood processing machine which is capable of taking a whole tree and delimbing the same, cutting it into proper firewood lengths, split these lengths, stacking the same and finally bundling and baling the stack for transport in unitized condition to the ultimate user. This result is accomplished in a single unit which is capable of accomplishing each step of the process in unison with a minimum of effort, equipment and manpower, but with high efficiency and rapid accomplishment of the process.

In view of the above, it is an object of the present invention to provide a timber to firewood processing machine that takes a tree from initial cut down and processes the same into bundled, baled firewood.

Another object of the present invention is to provide in a single self-propelled unit, a tree pick-up, limb trimmer, firewood log cutter, firewood log splitter and split wood bundler and baler means.

Another object of the present invention is to provide in a firewood processing machine, an improved cam type log feed mechanism.

Another object of the present invention is to provide a tree pick-up and delimber, a firewood log cutter, a firewood log splitter and split wood bundling means all of which are remotely controlled from a central location.

Another object of the present invention is to provide a processing machine that converts tree type timber into split firewood which is bundled, baled and ready for consumer distribution.

Another object of the present invention is to provide a timber to firewood processing machine which is capable of semi-automatic operation.

Another object of the present invention is to provide a timber to firewood processing machine that is simple and yet sturdy in construction and is self-contained in operation.

Other objects and advantages of the present invention will become apparent and obvious from a study of the following description and the accompanying drawings which are merely illustrative of such invention.

BRIEF DESCRIPTION OF DRAWINGS

FIG. 1 is a top plan view of the timber to firewood processing machine of the present invention;

FIG. 2 is a section taken through lines 2—2 of FIG. 1;

DETAILED DESCRIPTION OF THE INVENTION

Figure 3:
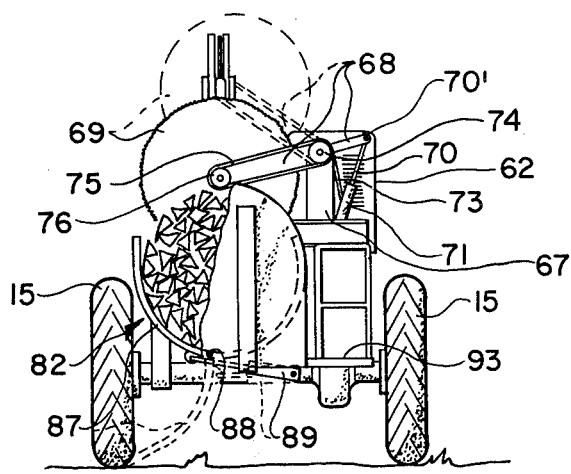
FIG. 3 is a rear elevational view of the machine of the present invention.
Figure 5:
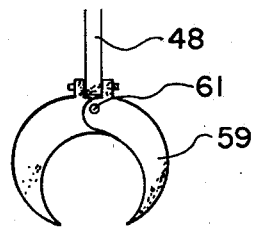
FIG. 5 is a fragmentary view of the pick-up claws on the end of the lift boom.
Figure 4:
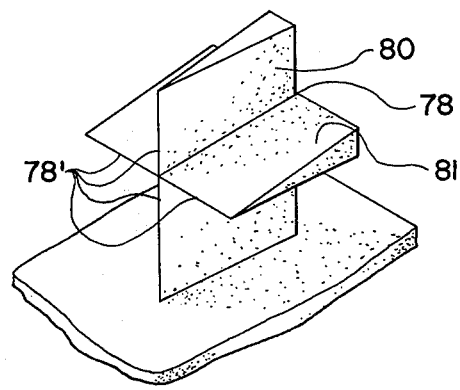
FIG. 4 is an enlarged fragmentary view of the splitter wedges of the present invention.

With further reference to the drawings, the mobile timber to firewood processing machine of the present invention indicated, generally at 10, includes a main frame indicated generally at 11. This frame is preferably generally rectangular in shape to define a forward portion 12, rear portion 13 and side portions 14.

A plurality of wheels 15 are rotatively mounted on axles 16. These axles are operatively connected to frame 11 by means such as axle hangers 17. Each of the wheels 15 are preferably independently driven by means such as hydrostatic drive means (not shown) which are well known to those skilled in the art of timber related equipment and further description of the same is not deemed necessary. Likewise, steerage can be accomplished by independent braking of the wheels on one side with driving of the wheels on the opposite side. Some other type of steerage means could, of course, be substituted if this were deemed advantageous or desirable.

A tilt bed, indicated generally at 18, includes a forward cross frame member 19, intermediate cross frame member 20 and rear cross frame member 21 which are fixedly secured to side members 22 as shown.

Figures 1, 2:
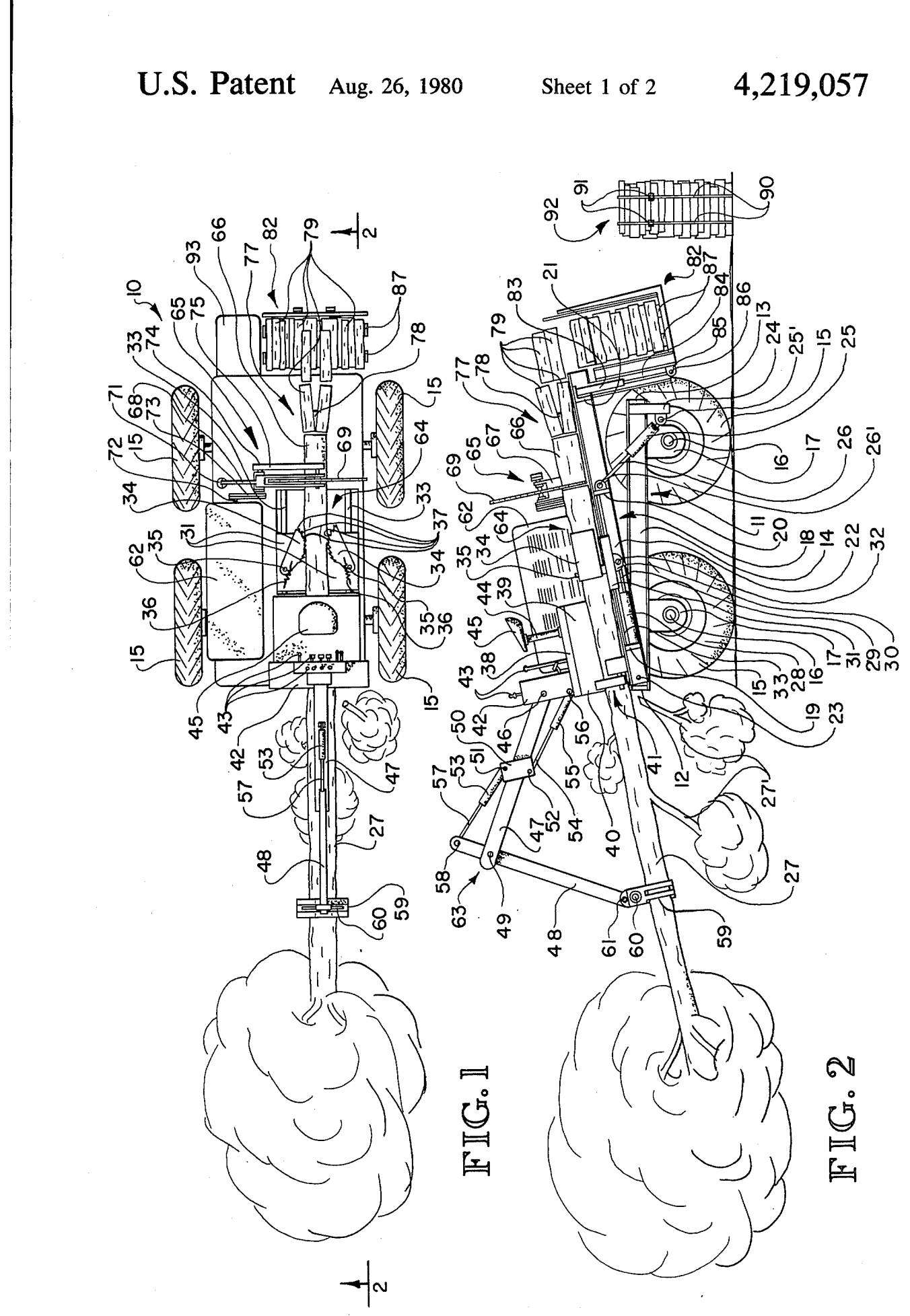

A pivot rod 23 is provided between the side portions 14 of frame 11 and passes through tilt bed side members 22 as can clearly be seen in FIG. 1 to allow tilting of bed 18 from horizontal nesting with frame 11 to a steep angular inclination.

Fixedly secured to and depending from rear frame portion 13 is a hydraulic cylinder mounting member 24. This member is adapted to pivotably mount at 25' one or more hydraulic cylinders 25 as can be seen clearly in FIG. 1. The end of the rod portion 26 of cylinder 25 is adapted to be pivotably mounted to bed cross member 21 by means such as pin 26'. Thus it can be seen that as hydraulic cylinder 25 is activated, bed 18 can be pivoted angularly up and down as required to feed timber through the machine.

Fixedly secured to front cross member 19 and extending rearwardly therefrom is at least one timber feed hydraulic cylinder 28. The rod portion 29 of cylinder 28 is operatively secured to the downwardly projecting flange 30 of timber feed drive plate 31 by means such as pin 32.

The timber feed drive plate 31 is slidably mounted on tilt bed 18 for fore-and-aft reciprocating movement as can clearly be seen in FIGS. 1 and 2. Guide rods 33 are provided to prevent any tendency of the timber feed drive plate from binding due to side wobble.

Each of the feed claws 34 are pivotably mounted on a heavy duty pivot 35 which is fixedly secured at its lower end to drive plate 31 as can be seen in FIG. 1. These two feed claws are biased toward each other by means such as springs 36 in a manner similar to the cam cleats used to hold sheet lines on a sailboat. Each of the feed claws 34 includes a plurality of gripping teeth 37 which are so designed that when the drive plate 31 is moving forwardly, the teeth will slide easily along the sides of the timber 27, but when the drive plate is moving rearwardly, the teeth will dig into the timber and carry the same rearwardly with such drive plate.

A driver's platform 38 is provided with supporting side walls 39 secured to tilt bed 18 to form the hollow tunnel-like opening 40 through which timber 27 is fed. Mounted within the tunnel-like opening 40 is a tree delimbing mechanism, indicated generally at 41. Since delimbers are used in conjunction with many different types of tree harvesters, mechanisms of this type are considered well known to those skilled in the art and further detailed description thereof is not deemed necessary.

A control console 42 with control mechanisms 43 is mounted on platform 38. Also mounted on platform 38 is driver's seat 45 supported by stanchion 44.

To the forward portion of console 42 is pivotably mounted, on pivot rod 46, lift arm 47. Pivotably mounted at the outer end of lift arm 47 (but intermediate its ends) is forearm 48. This pivot between lift arm 47 and forearm 48 is provided about pivot pin 49 as seen clearly in FIG. 1.

A pair of plates 50 are fixedly secured to either side of lift arm 47. These mounting plates have pivots 51 and 52 passing therebetween, the former pivot mounting hydraulic cylinders 53 and the latter pivotably mounting hydraulic rod 54. This last mentioned rod is operatively associated with hydraulic cylinder 55 which is pivotably mounted to the lower portion of console 42 by pivot 56.

The rod 57 of cylinder 53 is pivotably attached to the upper end of forearm 48 by pivot 50 as again can be seen clearly in FIG. 1. The lower end of forearm 58, as shown in the drawings, has pivotably attached thereto pick-up claws 59 which are hydraulically opened and closed by hydraulic cylinder 60. Although the tilt of pick-up claws 59 relative to forearm 48 can be hydraulically controlled, pivot 61 is considered adequate in most operations utilizing the machine of the present invention.

Since pick-up claws of the type shown at 59 are considered well known to those skilled in the art, further discussion of the mechanical details of the same is not deemed necessary.

Within cowl 62 is housed an engine, preferably of the internal combustion type although other power sources could obviously be substituted therefor, hydraulic pumps, power take-off drive means and the like. Since the details of all of these various systems are well known to those skilled in the art, further discussion of the same is not deemed necessary other than to mention that they can either be mounted on the tilt bed 18 as shown or can be mounted on frame 11 with the tilt bed mounting only the parts necessary in processing timber into firewood.

A cutting means indicated generally at 65 is provided to cut the timber 27 being fed through the machine 10 into firewood length logs as indicated at 66. This cutting means is preferably in the form of an uprightly projecting support or stanchion 67 fixedly secured at its lower end to tilt bed 18. The upper end of stanchion 67 pivotably mounts saw arm 68. On one end of this latter mentioned arm is rotatively mounted saw blade 69. The other end of such arm is connected at pivot 70' to the end of rod 70 of hydraulic cylinder 71. This latter mentioned hydraulic cylinder is pivotably mounted to tilt bed 18 whereby saw blade 69 can be raised and lowered as can clearly be seen in FIG. 3.

A power take-off 72 of standard well known configuration is provided which drives belt 73. Pulley drive 74 is provided through the pivot of stanchion 67 and saw arm 68 to allow belt 73 to drive belt 75. The pulley 76 fixedly secured to saw blade 69 allows belt 75 to drive blade 69 in the usual well known manner.

Although a circular saw blade has been shown and described as the cutting means indicated generally at 65, it is to be understood that other means such as chain saws, hydraulic shears or the like could be substituted.

The log splitting portion, indicated generally at 88, includes a generally T-shaped in cross section splitting wedge 78 fixedly secured by weldment or other means to tilt bed 18. Depending on the size of the log 66 being split and the desired size of the firewood 79, additional vertical portions 80 and/or horizontal portions 81 of wedge 78 can be provided. These additional vertical and horizontal portions would preferably be in staggered relationship so that the splitting process would not be impeded. Also it is envisioned that the splitting wedge 78 can be either fixedly secured as mentioned above or could be vertically movably mounted by either mechanical or hydraulic means so that the center of the log could be aligningly engaged for proper splitting.

Just aft of the splitting station 77 is a bundling rack, indicated generally at 82, into which the split firewood stackingly falls. To prevent the split wood from falling too great a distance (which could possibly prevent proper stacking of the wood in the bundling rack), one or more hydraulic cylinders 83 are provided which are fixedly secured to the rear portion of tilt bed 18. The rod 84 of cylinder 83 is secured to the bundling rack 82 by means such as tab 85 and pivot 86. Thus it can be seen that the bundling rack 82 can be moved upwardly and downwardly as is dictated by the amount of split by wood 79 stacked therein.

One side of the bundling rack 82 includes a plurality of bundling arms 87 which are pivotably mounted at 88. These bundling arms are held in the position shown in solid lines in FIG. 3 by means such as hydraulic cylinder 89 which, when activated, will drop such arms to the position shown in dotted lines in FIG. 3 thus allowing the firewood contained within the bundling rack to be discharged from the machine.

Prior to discharge from the machine, however, the firewood 79 is baled. This baling process can either be accomplished by an automatic strapping machine (not shown) or can be done manually by passing a plurality of steel bands or similar securing means 90 around the wood contained in the bundling rack and tightly securing the same by any well known means such as crimped sleeves 91. Once the wood has been bundled in the bundling rack and baled, then it is discharged from the machine as the baled stack of wood indicated generally at 92 and is ready for pick up and transport to the ultimate customer.

If desired, a trailer type vehicle could, of course, be secured to the rear of the processing machine of the present invention so that the baled stacks of wood could be off loaded from the machine directly onto the trailer which, when full, could be used to transport the baled product to the ultimate consumer.

When the baling of bundled wood is accomplished by a manually operated strapping machine, the operator stands on platform 93. If an automatic strapping machine is used, then this area would be converted to such purpose.

In operation of the mobile timber to firewood processing machine of the present invention, the operator (not shown) sitting on seat 45 and manipulating controls 43 drives the machine until it is lined up with a downed tree or stump end of the timber 27 is picked up by claws 29 through manipulation of hydraulic cylinders 55, 53 and 60 in their normal mode of operation through controls 43 from the power plant contained within cowl 62. The lower or stump end (which is usually relatively free of limbs) is guided into delimber 41. The tilt bed 18 is then aligned with the axis of tree or timber 27. Through continued manipulation of the lift boom indicated generally at 63 and the easing forward of the machine 10, the timber to be processed is forced between feed claws 34 or the feed mechanism indicated generally at 64. The lift boom 63 is then used simply to steady the timber 27 during the processing of the timber.

Again through manipulation of controls 43, the timber feed drive plate 31 moves to the position shown in FIG. 2. As hydraulic cylinder 28 is operated, the timber feed drive plate 31 with its associated feed claws 34 will move rearwardly carrying the timber 27 firmly gripped by the cam action of the feed claws 34 with it. The forward to rear distance of travel of the feed plate and its associated feed claws is equivalent of the length of the firewood logs to be cut.

Once the rearmost position of the feed mechanism 64 has been reached, hydraulic cylinder 71 will be activated to drop the end of arm 68 carrying blade 69 into cutting contact with the timber. This blade is, of course, rapidly turning as the result of power take-off 72 driving belts 73 and 75 through pulley drive 74.

As soon as log 66 is cut (or during the cutting thereof), drive plate 31 moves to its forwardmost position with the cam claws 34 dragging lightly against the side of the timber 27. Biasing springs 36 hold these cam claws in the contactive position shown in FIG. 2, as soon as the cutting of log 66 is complete and hydraulic cylinder 71 has been activated to raise saw blade 69 clear of its cut, timber 27 will be again driven rearwardly gripped between claws 34. Timber 27 will then force cut log 66 into splitting engagement with the cutting edges 78' of wedge 78. This forced ramming of log 66 will cause the same to split into firewood size pieces as shown at 79.

As soon as the cutting process of blade 69 is repeated, timber 27 is again moved rearwardly and the just split firewood 79 will be forced into bundling rack 82 by the next log 66 being forced against wedge 78 and being split.

As bundling rack 82 begins to fill up, it is slowly dropped by activating hydraulic cylinder 83 so that the firewood 79 being fed thereinto has only a short drop so that it will stackingly be aligned within the rack.

As the timber 27 is fed into the machine 10 of the present invention, the limbs 27' thereon are sheared off by delimber 41 so that a relatively limbless timber is fed into the feed mechanisms 64.

When the bundling rack 82 is full, either the automatic strapping machine (not shown) or the operator (not shown) of the manually operated strapping device standing on platform 93 will place field strapping bands or other suitable means about the bundle and will tightly secure the same through the use of crimped sleeves or other suitable means. Hydraulic cylinder 89 will then be activated dropping bundling arms 87 to the position shown in dotted lines in FIG. 3. The baled bundle or stack of wood 92 is then readily removed from the machine 10 and can be left sitting on the ground as shown in FIG. 1 for pick up and transport to the ultimate user.

As mentioned above, a triler similar to that used in conjunction with tobacco primers and hay balers can be used to receive the baled firewood so that separate pick up will not be necessary. Since trailers of this type can vary substantially in design and manner of loading, etc., further details of the same are not deemed necessary for completion of the disclosure of the present invention.

As soon as the baled stack 92 is removed from the bundling rack 82, the bundling arms 87 can be moved back to their position shown in solid lines in FIG. 3 and the machine is ready to continue its timber to firewood processing.

Although not shown specifically in the drawings, the lift boom 63 could be outfitted with a tree shearing or other similar cutting device for use in the same manner as tree harvesters to cut the tree down prior to beginning of the timber to firewood processing hereinabove described.

From the above description, it can readily be seen that the mobile timber to firewood processing machine of the present invention can be driven to the area where the timber 27 is located, can self-feed such timber through the machine, delimbing and cutting such timber into firewood length logs and splitting such logs into firewood size pieces before stacking and baling the same ready for shipment to market. In addition to the continuous feed, semi-automatic operation mentioned above, the present invention has the advantage of greatly reducing the labor required and thus the cost per cord of wood produced.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A wood processing machine comprising: a self-propelled land type vehicle having an operative power source; a hydraulic type lift boom means with a pick-up claw on one end thereof operatively mounted on said vehicle for picking up timber and feeding it into said machine; a timber feed mechanism in the form of horizontally disposed feed claws pivotably disposed on opposite sides of said timber, said mechanism operatively mounted on said vehicle to feed said timber through said wood processing machine; cutting means mounted on said vehicle for cutting said timber into firewood length logs; splitting means operatively mounted on said vehicle for splitting said logs into burnable size firewood; means for stackingly receiving said firewood after it has been split.

2. The wood processing machine of claim 1 wherein a delimber means is operatively mounted on said vehicle for removing any limbs that are outwardly projecting from said timber.

* * * * *